(12) United States Patent
Yoon et al.

(10) Patent No.: US 12,218,433 B2
(45) Date of Patent: Feb. 4, 2025

(54) COMMUNICATION APPARATUS FOR VEHICLE AND CONTROL METHOD THEREFOR

(71) Applicant: LG INNOTEK CO., LTD., Seoul (KR)

(72) Inventors: Jin Ho Yoon, Seoul (KR); Seung Hyun Yang, Seoul (KR); Tae Sup Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 95 days.

(21) Appl. No.: 17/758,368

(22) PCT Filed: Dec. 31, 2020

(86) PCT No.: PCT/KR2020/019469
§ 371 (c)(1),
(2) Date: Jul. 5, 2022

(87) PCT Pub. No.: WO2021/137649
PCT Pub. Date: Jul. 8, 2021

(65) Prior Publication Data
US 2023/0027539 A1    Jan. 26, 2023

(30) Foreign Application Priority Data
Jan. 2, 2020  (KR) .................. 10-2020-0000444

(51) Int. Cl.
*H01Q 3/24* (2006.01)
*H01Q 1/32* (2006.01)
(Continued)

(52) U.S. Cl.
CPC ............ *H01Q 3/24* (2013.01); *H01Q 1/32* (2013.01); *H04B 1/0483* (2013.01); *H04B 7/0691* (2013.01); *H04B 2001/0433* (2013.01)

(58) Field of Classification Search
CPC .. H01Q 3/24; H01Q 1/32; H01Q 5/50; H01Q 1/3208; H01Q 1/325; H01Q 9/0407;
(Continued)

(56) References Cited

U.S. PATENT DOCUMENTS

2010/0195753 A1*  8/2010  Yamamoto ............ H01Q 1/243
                                                              375/267

FOREIGN PATENT DOCUMENTS

| JP | 10-190516 A | 7/1998 |
| JP | 2013-255225 A | 12/2013 |

(Continued)

OTHER PUBLICATIONS

International Search Report dated Apr. 19, 2021 in International Application No. PCT/KR2020/019469.
(Continued)

*Primary Examiner* — Hoang V Nguyen
*Assistant Examiner* — Brandon Sean Woods
(74) *Attorney, Agent, or Firm* — Saliwanchik, Lloyd & Eisenschenk

(57) ABSTRACT

A communication apparatus for a vehicle according to an embodiment and a control method therefor are disclosed. The communication apparatus for a vehicle comprises: an antenna unit including a first antenna and a plurality of second antennas; a first switch for switching a first path to the first antenna and a second path to each of the plurality of second antennas; a second switch for switching a second path to any one of the plurality of second antennas; a length adjustment unit that is connected to the second path to the one second antenna connected to the second switch and adjusts the resonance length of the connected second antenna; and a communication control unit that generates a switching signal for connection to any one of the plurality of second antennas according to the state of the first antenna.

9 Claims, 9 Drawing Sheets

(51) Int. Cl.
*H04B 1/04* (2006.01)
*H04B 7/06* (2006.01)

(58) Field of Classification Search
CPC .... H01Q 3/245; H01Q 21/296; H04B 1/0483; H04B 7/0691; H04B 2001/0433; H04B 1/0458; H04B 1/3822
USPC ........................................................ 343/702
See application file for complete search history.

(56) References Cited

FOREIGN PATENT DOCUMENTS

| | | |
|---|---|---|
| KR | 10-2008-0038031 A | 5/2008 |
| KR | 10-2016-0091891 A | 8/2016 |
| KR | 10-1745612 B1 | 6/2017 |
| KR | 10-1778527 B1 | 9/2017 |
| KR | 10-2018-0027944 A | 3/2018 |
| WO | 2009/142000 A1 | 11/2009 |

OTHER PUBLICATIONS

Supplementary European Search Report dated Feb. 24, 2023 in European Application No. 20909090.1.
Office Action dated Oct. 15, 2024 in Japanese Application No. 2022-534273.

\* cited by examiner

COMMUNICATION APPARATUS FOR VEHICLE AND CONTROL METHOD THEREFOR

CROSS-REFERENCE TO RELATED APPLICATIONS

This application is the U.S. national stage application of International Patent Application No. PCT/KR2020/019469, filed Dec. 31, 2020, which claims the benefit under 35 U.S.C. § 119 of Korean Application No. 10-2020-0000444, filed Jan. 2, 2020, the disclosures of each of which are incorporated herein by reference in their entirety.

TECHNICAL FIELD

Embodiments relate to a communication apparatus for a vehicle and a control method thereof.

BACKGROUND ART

An antenna is a device used to efficiently emit radio waves to a space for wireless communication. In particular, the importance of antennas is increasing as usage of wireless communication is increasing exponentially, compared to that of wired communication.

A car includes not only mechanical components but also a large number of electronic components and thus an antenna is essentially included in the car.

FIGS. 1A and 1B are diagrams for describing problems of a communication apparatus for a vehicle of the related art.

Referring to FIGS. 1A to 1B, the communication apparatus for a vehicle of the related art may include a communication control unit 10 and an antenna 20. The communication control unit 10 may include a plurality of communication modems, and the plurality of communication modems may be connected to a plurality of antennas 20, which are provided according to a supported communication method, e.g., 5G, V2X, GPS, BT/WiFi, radio, DMB or the like, to establish communication.

In this case, an antenna may be damaged due to an emergency such as an accident or damage to a vehicle. Even when there are undamaged antennas in the vehicle, the undamaged antennas may be unusable when there is no connection path. Even when there is a connection path for connection to an antenna that is not damaged, it is difficult to check whether the antenna is damaged or not and it is impossible to interwork with the antenna due to a different resonance point.

RELATED ART LITERATURE (Patent Document 1) Korean Patent Laid-Open Publication No. 10-2018-0027944
(Patent Document 2) Korean Patent Laid-Open Publication No. 10-2016-0091891

DISCLOSURE

Technical Problem

Embodiments relate to a communication apparatus, for a vehicle, having a communication recovery function and a control method thereof.

Technical Solution

A communication apparatus for a vehicle according to an embodiment may include an antenna unit including a first antenna and a plurality of second antennas, a first switch for switching between a first path to the first antenna and second paths to the plurality of second antennas, a second switch for switching the second path to one of the plurality of second antennas, a length adjustment unit connected to the second path to one second antenna connected to the second switch and configured to adjust a resonance length of the connected second antenna, and a communication control unit configured to generate a switching signal for connection to one of the plurality of second antennas according to a status of the first antenna.

The length adjustment unit may include a plurality of circuits, and the plurality of circuits may include a bypass circuit configured to maintain the resonance length, a first adjustment circuit configured to reduce the resonance length, and a second adjustment circuit configured to increase the resonance length.

The first adjustment circuit may include at least one capacitor, and the second adjustment circuit may include at least one inductor.

The communication apparatus may further include a third switch connected between the second switch and the length adjustment unit and configured to switch one second antenna, which is connected to the second switch, to be connected to one of the plurality of circuits.

The communication control unit may detect a level of a received signal by sequentially connecting each of the plurality of second antennas and each of the plurality of circuits, select a second antenna and a circuit corresponding to a highest level of the signal, and generate a switching signal for connecting the selected second antenna and the selected circuit.

The second switch may select a second antenna among the plurality of second antennas, the third switch may be connected to one end of the selected circuit to be connected to the selected second antenna, and the first switch may be connected to the other end of the selected circuit.

The communication control unit may detect a level of a signal received through the first antenna and check whether the first antenna is connected on the basis of the detected level of the signal, and control the first switch, the second switch, and the third switch to connect a second path to a second antenna selected from among the plurality of second antennas and one circuit, when the first antenna is not connected normally.

The communication control unit may primarily check a status of the first antenna using the level of the signal received through the first antenna, secondarily check the status of the first antenna according to whether the first antenna is connected, and determine the status of the first antenna according to results of the primary checking and the secondary checking.

A control method of a communication apparatus for a vehicle according to an embodiment includes: when communication is established by connecting to a first antenna, determining a status of the first antenna; when the first antenna does not operate normally, sequentially connecting one second antenna from among the plurality of second antennas and one of a plurality of circuits for adjusting a resonance length of the one second antenna; and establishing communication by detecting a level of a signal received through the connected second antenna, selecting a second antenna from among the plurality of second antennas on the basis of the detected level of the signal, and connecting to the selected second antenna.

The determining of the status of the first antenna may include primarily checking the status of the first antenna using a level of a signal received through the first antenna, secondarily checking the status of the first antenna according to whether the first antenna is connected, and determining the status of the first antenna according to results of the primary checking and the secondary checking.

The establishing of communication may include detecting a level of a received signal by sequentially connecting each of the plurality of second antennas and one of the plurality of circuits, selecting a second antenna and a circuit corresponding to a highest level of the signal, and connecting the selected second antenna and circuit.

Advantageous Effects

According to embodiments, when a first antenna does not operate normally, any one of a plurality of second antennas can be selectively connected to according to predetermined priority and a resonance length of the selectively connected second antenna can be adjusted to a predetermined resonance length, and therefore, when an antenna is damaged due to an emergency, urgent communication recovery can be performed using another antenna.

According to embodiments, it is possible to determine a situation in which the first antenna does not operate normally and thus pre-recovery can be done before operation of a vehicle.

According to embodiments, urgent communication recovery can be done using a plurality of antennas provided in a vehicle, thereby minimizing costs due to additional hardware configuration.

MODES OF THE INVENTION

Hereinafter, embodiments of the present disclosure will be described in detail with reference to the accompanying drawings.

However, the technical idea of the present disclosure is not limited to the embodiments set forth herein and may be implemented in many different forms and one or more components between embodiments may be selectively combined or replaced with other components without departing from the scope of the present disclosure.

Unless otherwise defined, all terms (including technical and scientific terms) used in the embodiments of the present disclosure have the same meaning as commonly understood by one of ordinary skill in the art to which the present disclosure belongs. It will be understood that terms, such as those defined in commonly used dictionaries, should be interpreted as having a meaning that is consistent with their meaning in the context of the relevant art.

Terms used in the embodiments of the present disclosure are for the purpose of only describing the embodiments and are not intended to be limiting of the present disclosure.

As used herein, singular forms are intended to include plural forms as well, unless the context clearly indicates otherwise. It will be understood that "at least one of (or at least one or more of) A, B, and C" indicates one or more of all possible combinations of A, B, and C.

Terms such as first, second, A, B, (a), and (b) may be used to describe components of embodiment of the present disclosure.

Such a term is only for distinguishing one component from another, and the essence of the component, an order or a sequence is not limited by the term.

When a component is referred to as being "coupled to" or "connected to" another component, it will be understood that the component is directly coupled to or connected to the other component or is coupled to or connected to the other component through another component interposed therebetween.

When one of components are referred to as being formed or disposed "on (or above)" or "below (or under)" the other, it will be understood that the components are in direct contact with each other or one or more components are formed or disposed therebetween. The expression "on (or above)" or "below (or under)" should be understood to include not only an upward direction but also a downward direction with respect to one component.

Embodiments suggest a new method of selectively connecting to one of a plurality of second antennas according to predetermined priority when a first antenna does not operate normally, and adjusting a resonance length of the selectively connected second antenna to a predetermined resonance length.

Figure 1A:
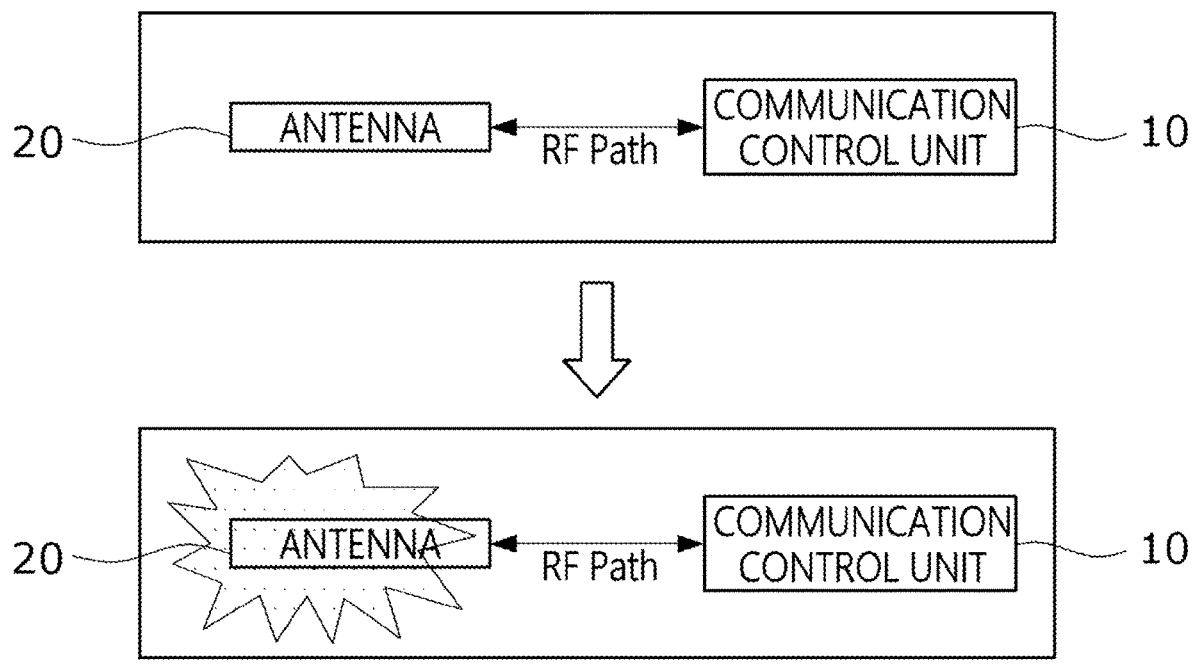
FIGS. 1A and 1B are diagrams for describing problems of a communication apparatus for a vehicle of the related art.
Figure 1B:
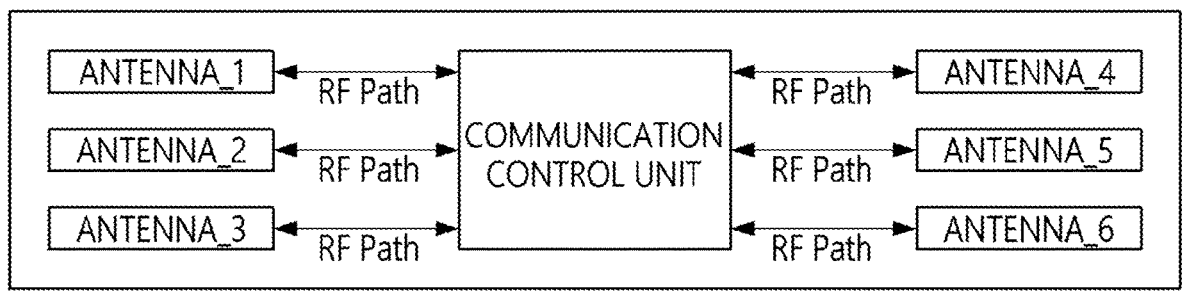
Figure 2:
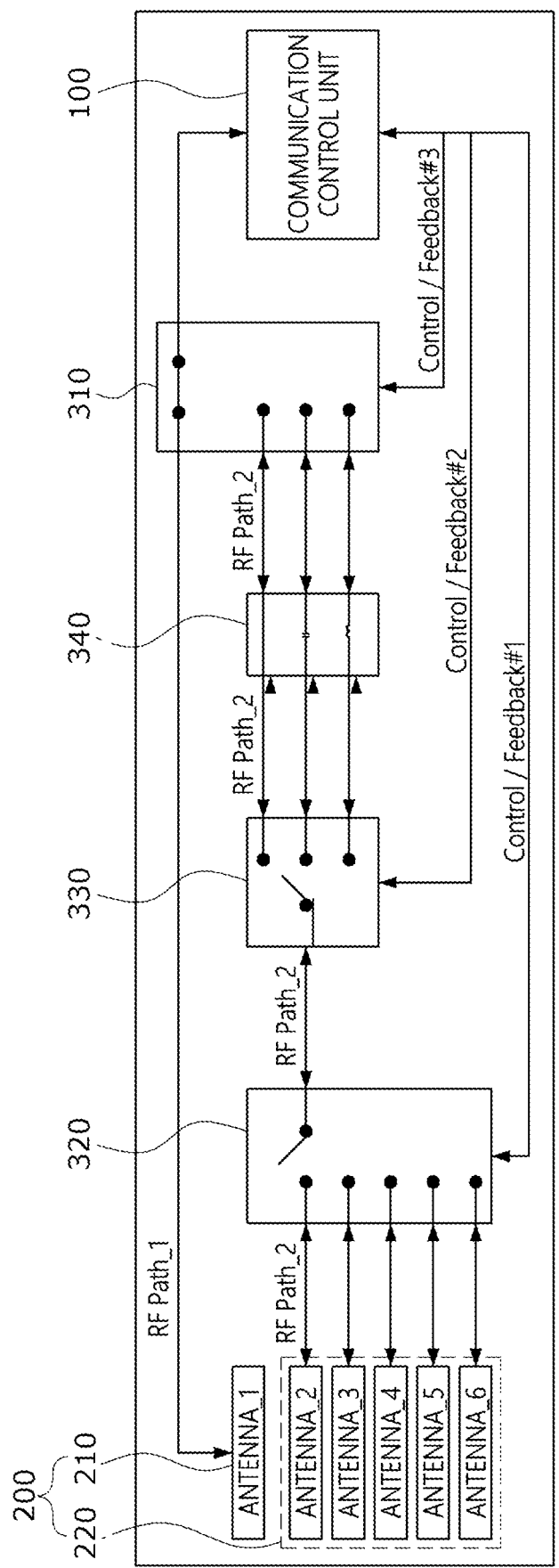
FIG. 2 is a diagram illustrating a configuration of a communication apparatus for a vehicle according to an embodiment of the present disclosure.

FIG. 2 is a diagram illustrating a configuration of a communication apparatus for a vehicle according to an embodiment of the present disclosure.

Referring to FIG. 2, a communication apparatus for a vehicle according to an embodiment of the present disclosure may include a communication control unit 100, an antenna unit 200, a first switch 310, a second switch 320, a third switch 330, and a length adjustment unit 340. The communication control unit 100 may periodically determine a status of a first antenna and connect to a second antenna according to a result of the determination. The communication control unit 100 may be connected to the first antenna through a first path RF path_1 when the first antenna operates normally, and may be connected to the second antenna through a second path RF Path_2 by controlling the first switch 310, the second switch 320, and the third switch 330, when the first antenna does not operate normally.

The communication control unit 100 may control a path by generating a switching signal for switching each of the first switch 310, the second switch 320, and the third switch 330.

The communication control unit 100 may determine a status of the first antenna by detecting a level of a signal received through the first antenna, primarily checking the status of the first antenna on the basis of the detected level of the signal, and secondarily checking the status of first antenna on the basis of whether the first antenna is connected.

In this case, the communication control unit 100 may check whether the first antenna is connected by checking whether a first path to the first antenna is open using an internal circuit.

In an embodiment, the status of the first antenna is determined through primary checking and secondary checking to inhibit switching to the second antenna when a signal level is low in a weak electric field area even when the first antenna operates normally.

The antenna unit 200 may include a first antenna 210 and a plurality of second antennas 220. For example, the first antenna may be an antenna_1 for 4G/5G, and the second antennas may be an antenna_2 for V2X, an antenna_3 for GPS, an antenna_4 for BT/WiFi, an antenna_5 for Radio, and an antenna_6 for DMB.

The first switch 310 may switch between the first path to the first antenna 210 and second paths to the plurality of second antennas 220. Here, the first switch 310 may be, for example, a single-pole multi-throw (SPXT) switch. The first switch 310 may generate a default path by maintaining a state in which the communication control unit 100 is connected to the first antenna 210.

The default path is generated to inhibit insertion loss in a switch and a path. That is, when an insertion loss rate is excessive, a transmission power level may increase, thus resulting in a decrease in communication quality due to lowering of linear performance.

The first switch 310 may switch to the second paths to the plurality of second antennas 220, and particularly, a second path to one of the plurality of second antennas 220.

Figure 3A:
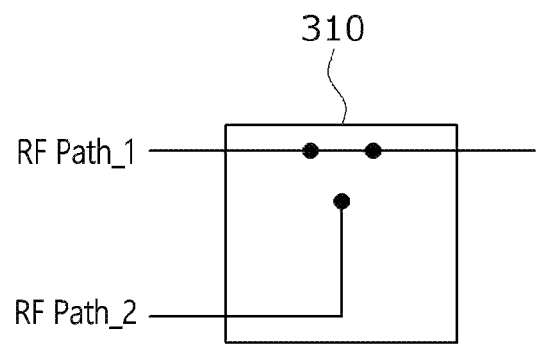
FIGS. 3A and 3B are diagrams for describing a configuration principle of a first switch shown in FIG. 2.
Figure 3B:
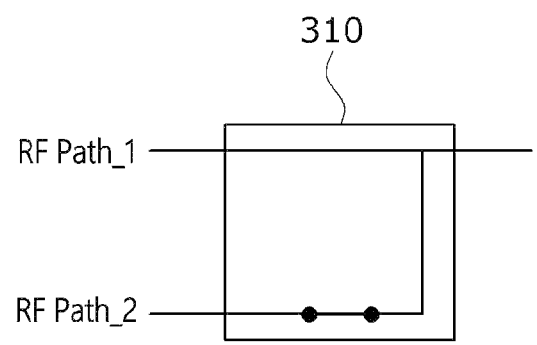

FIGS. 3A and 3B are diagrams for describing a configuration principle of a first switch such as that shown in FIG. 2.

Referring to FIG. 3A, when a first switch 310 according to an embodiment is designed to be positioned on a first path RF path_1, the first path RF Path_1 to a first antenna may be completely blocked.

Referring to FIG. 3B, when the first switch 310 is designed to be positioned on a second path RF Path_2, the first path RF Path_1 to the first antenna may not be completely blocked and thus a stub and an impedance mismatch may occur, thereby causing a signal loss.

Therefore, in an embodiment, the first switch 310 is designed to have a structure as shown in FIG. 3A.

The second switch 320 may switch to a second path of one of a plurality of second antennas. The second switch 320 may be, for example, an SPTX or multi-pole multi-throw (XPXT) switch. In this case, when the second switch 320 is used as the XPXT switch rather than the SPXT switch, two or more antennas are used.

The third switch 330 may be switched to one circuit in the length adjustment unit 340 to adjust a resonance length of a connected second antenna. The third switch 330 may be an SPXT switch.

The length adjustment unit 340 may adjust the resonance length of the second antenna to a predetermined resonance length. Because a resonance point of each antenna is different, a resonance length should be adjusted.

Figure 4:
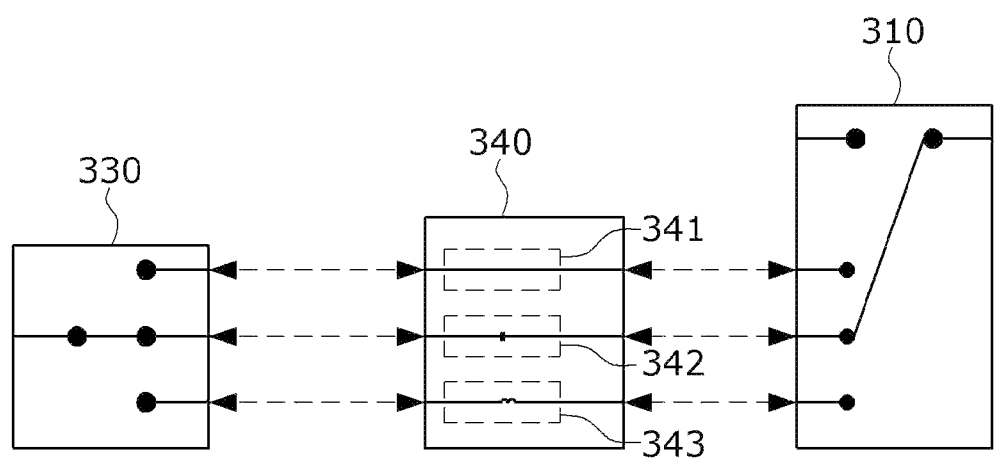
FIG. 4 is a diagram illustrating a detailed configuration of a length adjustment unit shown in FIG. 2.

FIG. 4 is a diagram illustrating a detailed configuration of the length adjustment unit 340 shown in FIG. 2.

Referring to FIG. 4, the length adjustment unit 340 according to an embodiment may include a plurality of circuits, and the plurality of circuits may include a first circuit 341, a second circuit 342, and a third circuit 343.

The first circuit 341 may maintain a resonance length of an antenna without adjusting the resonance length.

The second circuit 342 may reduce a resonance length of an antenna. The second circuit 342 may be implemented as, for example, at least one capacitor to reduce a resonance length of an antenna.

The third circuit 343 may increase a resonance length of an antenna. The third circuit 343 may be implemented as, for example, at least one inductor to increase a resonance length of an antenna.

Here, an example in which an adjustment circuit is configured with a capacitor and an inductor is described but the types, the number, etc. of elements constituting the adjustment circuit may be implemented differently.

In this case, the first circuit 341, the second circuit 342, and the third circuit 343 in the length adjustment unit 340 may be selected using the first switch 310 and the third switch 330. For example, the second circuit 342 may be selected by switching the first switch 310 to be connected to one end of the second circuit 342 and switching the third switch 330 to be connected to the other end of the second circuit 342.

Therefore, the first switch 310 and the third switch 330 may be switched with the same circuit.

As another example, paths each corresponding to one of second antenna candidates may be included in a length adjustment unit. Each of the paths may include elements having characteristic values for impedance matching of the second antenna candidate corresponding thereto. For example, when an antenna is selected as a second antenna by the second switch, a specific path for impedance matching of the antenna may be switched to, thereby forming a path to the first switch.

Figure 5:
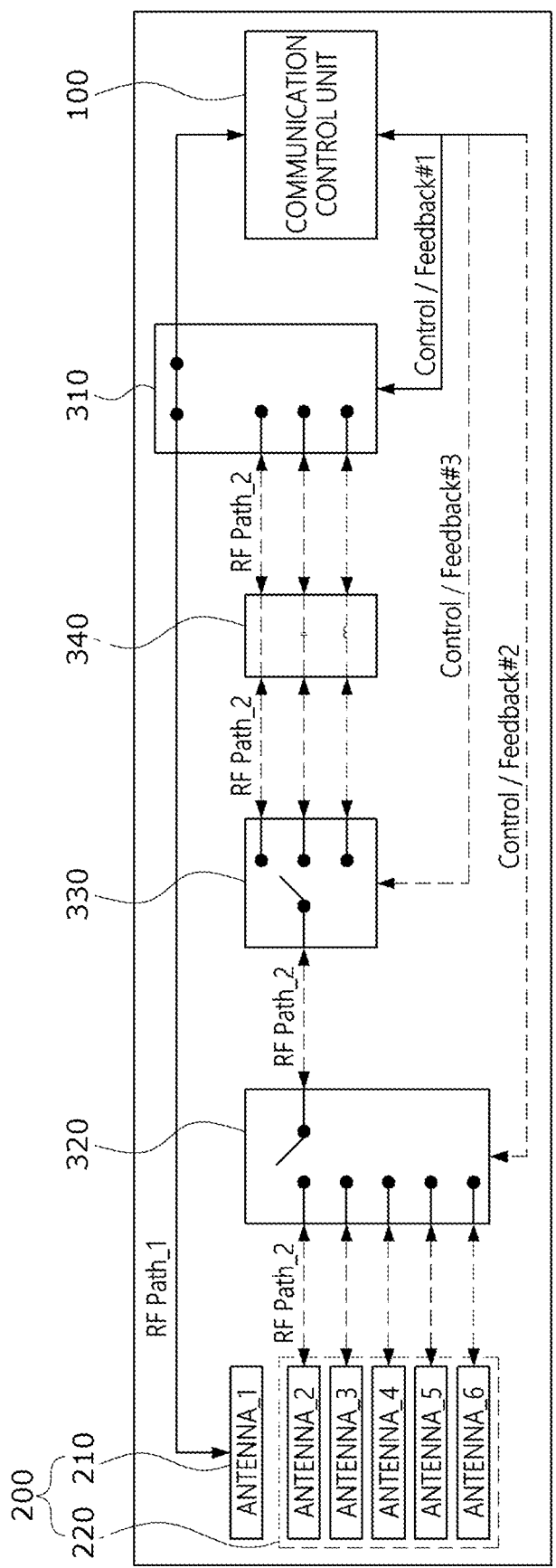
FIG. 5 is a diagram illustrating a connected state of a first antenna according to an embodiment of the present disclosure.
Figure 6:
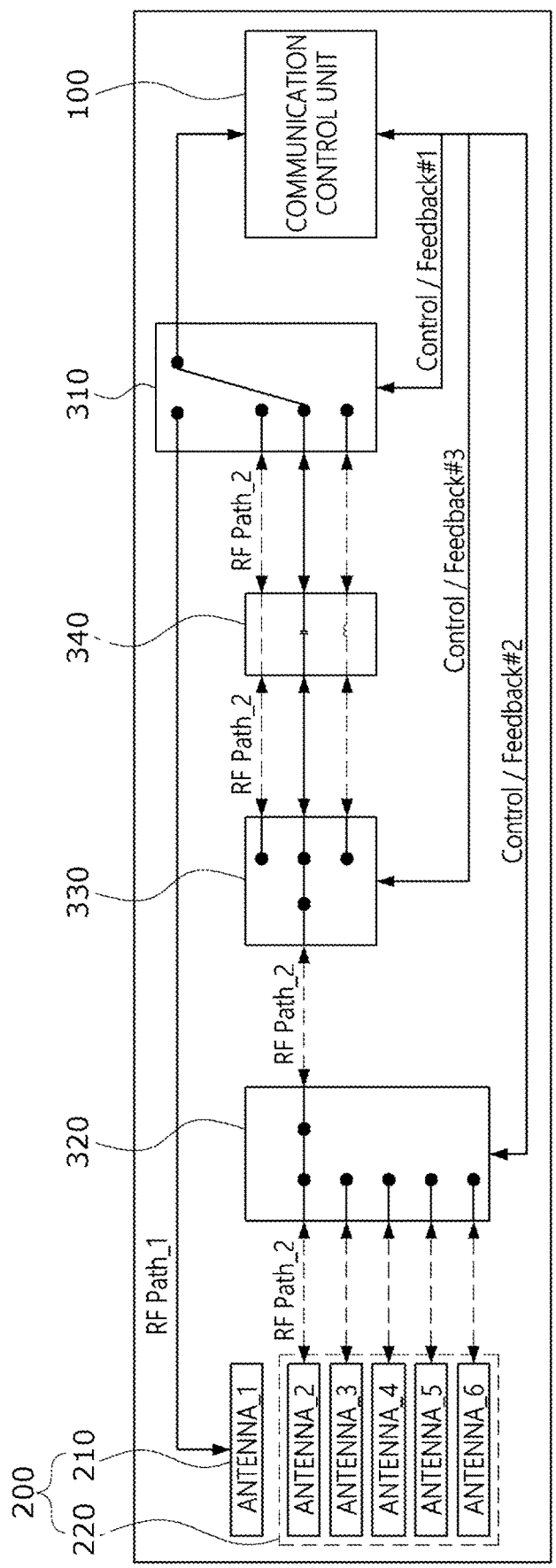
FIG. 6 is a diagram illustrating a connected state of a second antenna according to an embodiment of the present disclosure.

FIG. 5 is a diagram illustrating a connected state of a first antenna according to an embodiment of the present disclosure, and FIG. 6 is a diagram illustrating a connected state of a second antenna according to an embodiment of the present disclosure.

FIG. 5 illustrates an example in which a communication control unit 100 according to an embodiment is connected to a first antenna 210. The communication control unit 100 may be connected to the first antenna 210 and establish communication through the first antenna 210 connected thereto while a first switch 310 is connected to a first path.

Referring to FIG. 6, the communication control unit 100 according to the embodiment is connected to a second antenna antenna_2 among second antennas 220, when the first antenna 210 is damaged due to an accident of a vehicle and thus does not operate normally. The communication control unit 100 may be connected to the second antenna 220 and establish communication through the second antenna 220 connected thereto while a second switch 320 is connected to a second path.

When the first antenna 210 does not operate normally, the communication control unit 100 may detect a signal level by sequentially connecting all second paths to which the plurality of second antennas 200 are connectable in a predetermined order. In this case, each of the second paths to the plurality of second antennas 220 may be divided into three sub-paths according to whether a resonance length is adjusted or not.

For example, when there are three second antennas, the communication control unit 100 may detect signal levels corresponding to a total of nine paths, because there are three paths for each of the three second antennas.

The communication control unit 100 may compare the detected signal levels with one another and select a second antenna connected to the second path with a highest signal level according to a result of the comparison.

When the second antenna is selected, the communication control unit 100 may generate a first switching signal, a second switching signal, and a third switching signal for respectively controlling the first switch 310, the second switch 320, a third switch 330, and supply the first switching signal, the second switching signal, and the third switching signal to the first switch 310, the second switch 320, and the third switch 330, respectively.

For example, when a second antenna connected to a second circuit for reducing a resonance length is selected, the communication control unit 100 may switch the second switch 320 according to the second switching signal to be connected to the second antenna antenna_2 among the second antennas 220, switch the third switch 330 according to the third switching signal to be connected to one end of the second circuit, and switch the first switch 310 according to the first switching signal to be connected to the other end of the second circuit, thereby connecting to the second antenna antenna_2.

Figure 7:
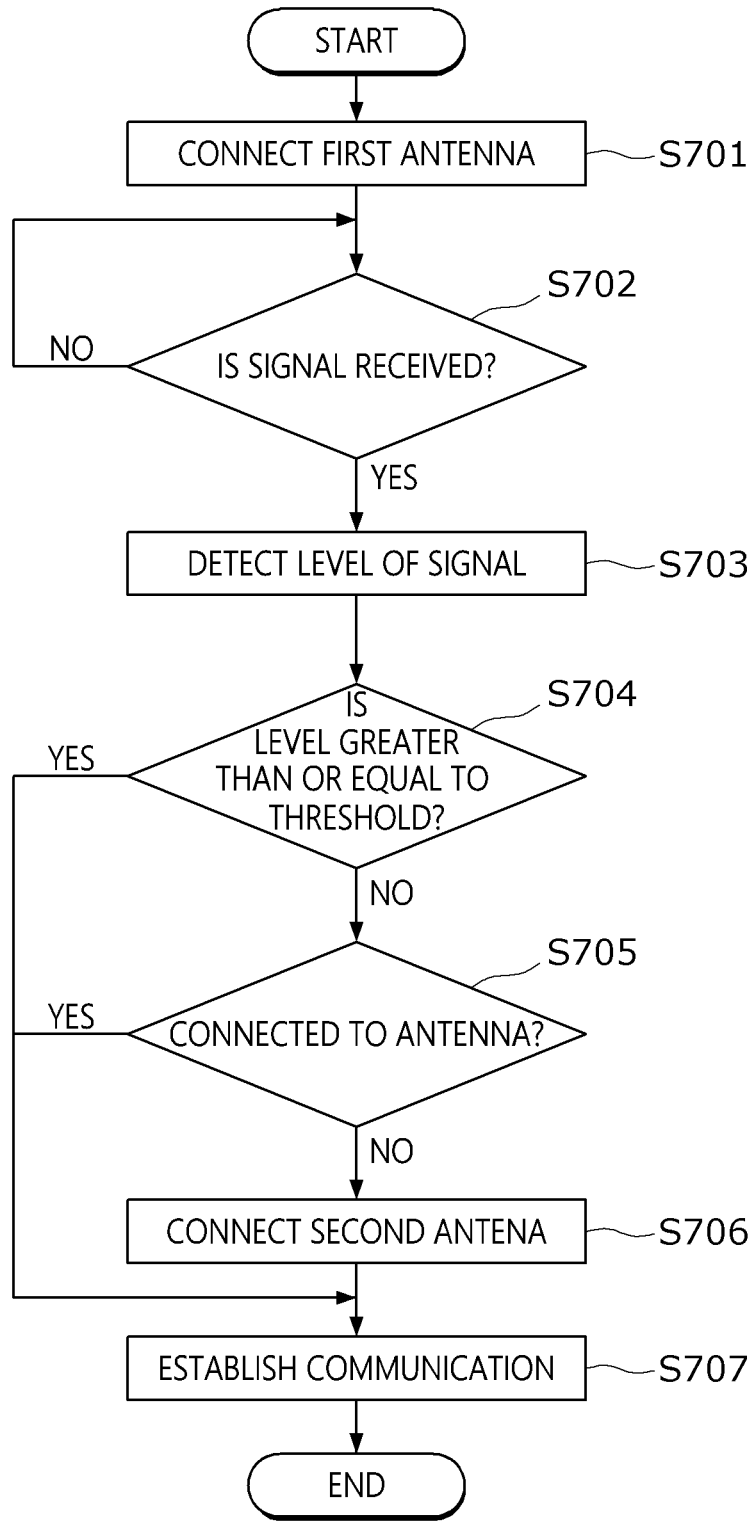
FIG. 7 is a diagram illustrating a control method of a communication apparatus according to an embodiment of the present disclosure.

FIG. 7 is a diagram illustrating a control method of a communication apparatus according to an embodiment of the present disclosure.

Referring to FIG. 7, a communication apparatus for a vehicle according to an embodiment of the present disclosure may be connected to a first antenna by default (S701) and transmit or receive signals through the first antenna.

When receiving a signal through the first antenna (S702), the communication apparatus for a vehicle may detect a level of the received signal (S703). Here, the level of the signal may be a received signal strength indicator (RSSI) level.

The communication apparatus for a vehicle may primarily check whether the detected level of the signal is greater than or equal to a predetermined threshold (S704). Here, when the detected level of the signal is less than the threshold, it may mean that the communication apparatus is located in a weak electric field area. Alternatively, the threshold may be used as a reference value for the communication apparatus for a vehicle to detect whether an antenna is damaged.

When the detected level of the signal is less than the threshold, the communication apparatus for a vehicle may secondarily check whether the first antenna is connected (S705). Whether the first antenna is connected indicates whether a first path is open or closed.

The communication apparatus for a vehicle may connect to one of a plurality of second antennas when a result of the secondary checking reveals that the first antenna does not operate normally (S706).

The communication apparatus for a vehicle establishes communication through the connected second antenna (S707). For example, the communication apparatus for a vehicle may establish emergency communication through the second antenna.

Figure 8:
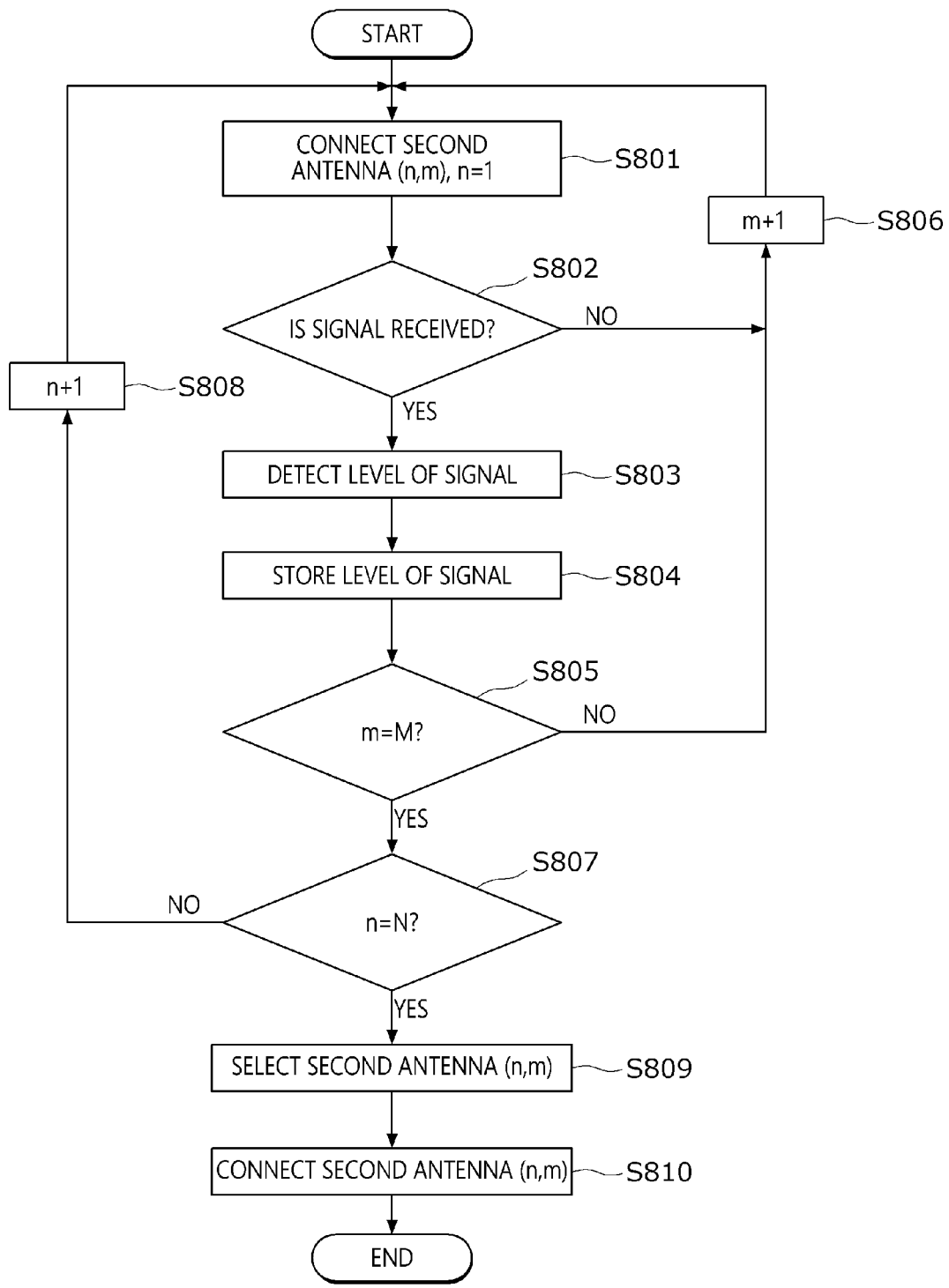
FIG. 8 is a diagram for describing a first connection process of connecting to a second antenna shown in FIG. 7.

FIG. 8 is a diagram for describing a first connection process of connecting to a second antenna shown in FIG. 7.

Referring to FIG. 8, when a first antenna does not operate normally, a communication apparatus for a vehicle according to an embodiment of the present disclosure may connect an $m^{th}$ path to an $n^{th}$ second antenna, i.e., a second antenna_$\{n, m\}$, among second antennas corresponding to predetermined antennas and circuits $\{N, M\}$ (S801).

In this case, a path to the $n^{th}$ second antenna may be divided into m paths according to whether a resonance length is adjusted or not.

When receiving a signal through the $m^{th}$ path to the $n^{th}$ second antenna connected (S802), the communication apparatus for a vehicle may detect a level of the received signal (S803). Here, the level of the signal may be an RSSI level.

The communication apparatus for a vehicle may store the detected level of the signal from the $m^{th}$ path to the $n^{th}$ second antenna (S804).

The communication apparatus for a vehicle may check whether m=M is satisfied (S805), and when m=M is not satisfied, a path sequence is changed to m+1 (S806). Thereafter, an iteration of connecting to an $(m+1)^{th}$ path to the $n^{th}$ second antenna may be performed.

On the other hand, when m=M is satisfied, the communication apparatus for a vehicle may determine that checking of all paths to the $n^{th}$ second antenna is completed and check whether n=N is satisfied (S807).

When n=N is not satisfied, the communication apparatus for a vehicle may change the antenna sequence to n+1 (S808), and an iteration of connecting to an $m^{th}$ path to an $(n+1)^{th}$ second antenna may be performed.

On the other hand, when n=N is satisfied, the communication apparatus for a vehicle may select the $m^{th}$ path to the $n^{th}$ second antenna with a highest signal level on the basis of the stored level of the signal (S809).

The communication apparatus for a vehicle may connect the $m^{th}$ path to the $n^{th}$ second antenna (S810).

In an embodiment, first, antennas with high signal levels, which are to be connected to, may be identified using a predetermined threshold and one of these antennas may be selected. In this case, two or more thresholds may be determined.

Figure 9:
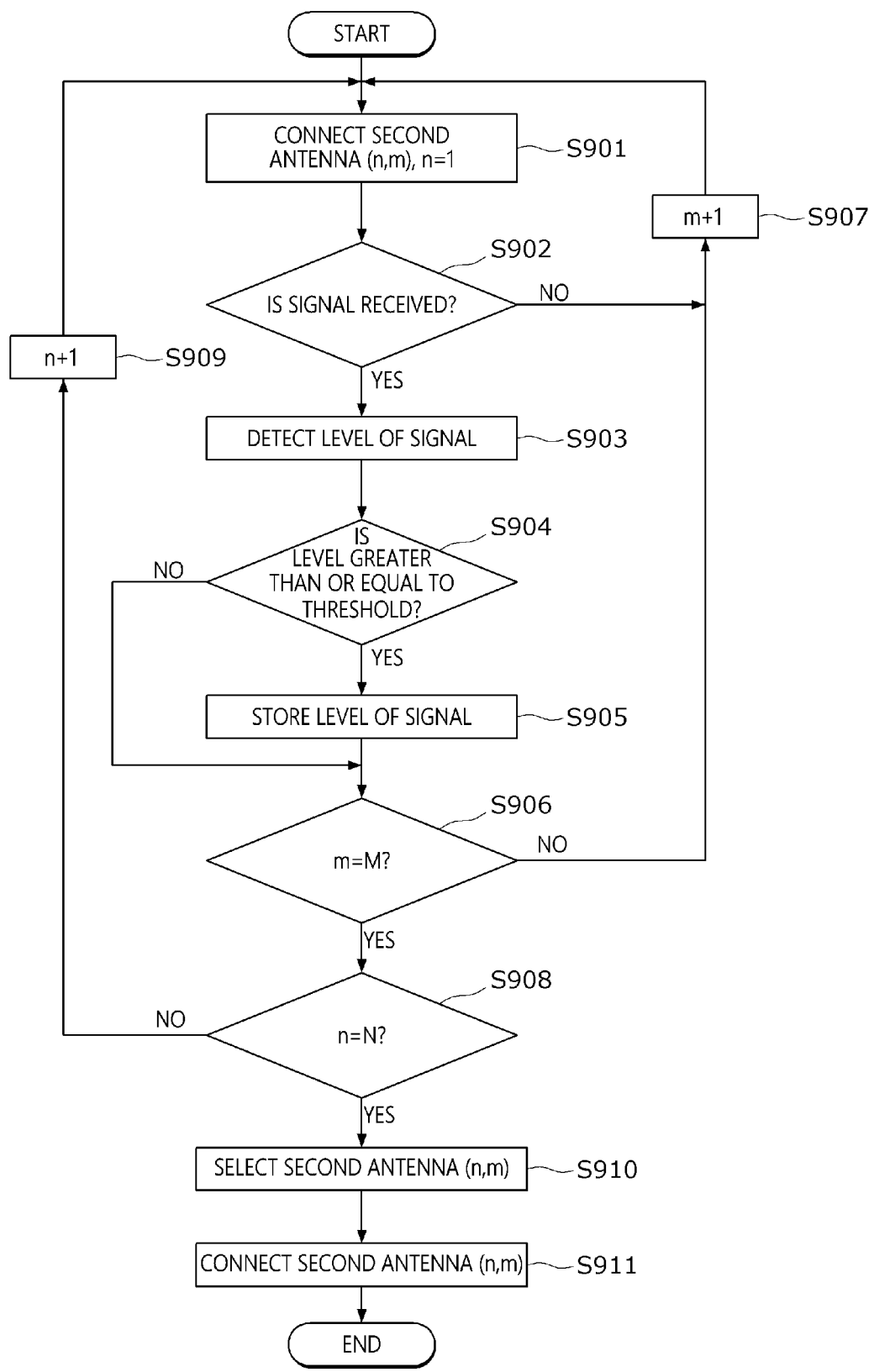
FIG. 9 is a diagram for describing a second connection process of connecting to the second antenna shown in FIG. 7.

FIG. 9 is a diagram for describing a second connection process of connecting to the second antenna shown in FIG. 7.

Referring to FIG. 9, when a first antenna does not operate normally, a communication apparatus for a vehicle according to an embodiment of the present disclosure may connect an $m^{th}$ path to an $n^{th}$ second antenna, i.e., a second antenna_$\{n, m\}$, among second antennas corresponding to predetermined antennas and circuits $\{N, M\}$ (S901).

When receiving a signal through the $m^{th}$ path to the $n^{th}$ second antenna (S902), the communication apparatus for a vehicle may detect a level of the received signal (S903).

The communication apparatus for a vehicle may check whether the detected level of the signal is greater than or equal to a predetermined threshold (S904).

When the detected level of the signal is greater than or equal to the threshold, the communication apparatus for a vehicle may store the detected level of the signal from the $m^{th}$ path to the $n^{th}$ second antenna (S905).

The communication apparatus for a vehicle may check whether m=M is satisfied (S906), and when m=M is not satisfied, a path sequence is changed to m+1 (S907). Thereafter, an iteration of connecting to an $(m+1)^{th}$ path to the $n^{th}$ second antenna may be performed.

On the other hand, when m=M is satisfied, the communication apparatus for a vehicle may determine that checking of all paths to the $n^{th}$ second antenna is completed and check whether n=N is satisfied (S908).

When n=N is not satisfied, the communication apparatus for a vehicle may change the antenna sequence to n+1 (S909), and an iteration of connecting to an $m^{th}$ path to an $(n+1)^{th}$ second antenna may be performed.

On the other hand, when n=N is satisfied, the communication apparatus for a vehicle may select the $m^{th}$ path to the $n^{th}$ second antenna with a highest signal level on the basis of the stored level of the signal (S910).

The communication apparatus for a vehicle may connect the $m^{th}$ path to the $n^{th}$ second antenna (S911).

Therefore, in an embodiment, an antenna with a high signal level among a plurality of second antennas may be selected.

The term "unit" used in the embodiments set forth herein should be understood to mean a software or hardware component, such as a field-programmable gate array (FPGA) or an application-specific integrated circuit (ASIC), which performs certain functions. However, the term "unit" is not limited to software or hardware. The term "unit" may be configured to be stored in an addressable storage medium or to execute one or more processors. Thus, the term "unit" may include, for example, components, such as software components, object-oriented software components, class components, and task components, processes, functions, attributes, procedures, subroutines, segments of program code, drivers, firmware, microcode, circuits, data, databases, data structures, tables, arrays, and parameters. Components and functions provided in "units" may be combined into a smaller number of components and "units" or may be divided into sub-components and "sub-units". In addition, the components and "units" may be implemented to execute one or more CPUs in a device or a secure multimedia card.

While the present disclosure has been described above with reference to exemplary embodiments thereof, it should be understood by those of ordinary skill in the art that various changes and modifications may be made without departing from the technical spirit and scope of the present disclosure defined in the following claims.

REFERENCE NUMERALS

100: communication control unit
200: antenna unit
210: first antenna
220: second antenna
310: first switch
320: second switch
330: third switch
340: length adjustment unit

The invention claimed is:

1. A communication apparatus for a vehicle, comprising:
an antenna unit including a first antenna and a plurality of second antennas;
a first switch circuit configured to switch between a first path to the first antenna and a second path to one of the plurality of second antennas;
a second switch circuit configured to switch the second path to one of the plurality of second antennas, and connected to the first switch circuit;
a length adjustment unit disposed on the second path, and configured to adjust a resonance length of the connected second antenna; and
a communication control unit configured to generate a switching signal for controlling the first switch circuit and the second switch circuit to be connected to a second antenna from the plurality of second antennas according to a status of the first antenna,
wherein when the first antenna does not operate normally, the communication control unit is configured to:
detect levels of received signals by sequentially connecting with each of the plurality of second antennas,
compare the levels of the received signals of the connected second antennas,
select the connected second antenna corresponding to a highest level of the received signal,
generate the switching signal for adjusting the resonance length of the selected second antenna, and
connect the selected second antenna and circuit by the generated switching signal.

2. The communication apparatus of claim 1, wherein the length adjustment unit comprises a plurality of circuits, wherein the plurality of circuits comprise:
a first circuit configured to maintain the resonance length;
a second circuit configured to reduce the resonance length; and
a third circuit configured to increase the resonance length.

3. The communication apparatus of claim 2, wherein the second circuit comprises at least one capacitor, and the third circuit comprises at least one inductor.

4. The communication apparatus of claim 2, comprising a third switch circuit connected between the second switch circuit and the length adjustment unit, and configured to switch one second antenna, which is connected to the second switch circuit, to be connected to any one of the plurality of circuits of the length adjustment unit.

5. The communication apparatus of claim 4, wherein the second switch circuit selects a second antenna from the plurality of second antennas,
wherein the third switch circuit is connected to one end of the selected circuit to be connected to the selected second antenna, and
wherein the first switch circuit is connected to another end of the selected circuit.

6. The communication apparatus of claim 4, wherein the communication control unit detects the level of a signal received through the first antenna and checks whether the first antenna is connected on the basis of the detected level of the signal, and controls the first switch circuit, the second switch circuit, and the third switch circuit to connect a second path to a second antenna selected from the plurality of second antennas and one circuit, when the first antenna is not connected normally.

7. The communication apparatus of claim 1, wherein the communication control unit primarily checks a status of the first antenna based on a level of a signal received through the first antenna, secondarily checks the status of the first antenna according to whether the first antenna is connected, and determines the status of the first antenna according to results of the primary checking and the secondary checking.

8. A control method of a communication apparatus for a vehicle comprising an antenna unit including a first antenna and a plurality of second antennas; a first switch circuit configured to switch between a first path to the first antenna and a second path to one of the plurality of second antennas, the first switch circuit connected to a communication control unit; a second switch circuit configured to switch the second path to one of the plurality of second antennas, the second switch circuit connected to the first switch circuit; a length adjustment unit disposed on the second path, and configured to adjust a resonance length of the connected second antenna; and the communication control unit configured to generate a switching signal for controlling the first switch circuit and the second switch circuit to be connected to a second antenna from the plurality of second antennas according to a status of the first antenna, the method comprising:
when communication is established by connecting to the first antenna, determining a status of the first antenna;

when the first antenna does not operate normally, detecting levels of received signals by sequentially connecting one second antenna from the plurality of second antennas and one of a plurality of circuits for adjusting a resonance length of the one second antenna after adjusting the first switch circuit; and comparing the levels of the received signals of the connected second antennas, selecting the connected second antenna corresponding to a highest level of the received signal, generating the switching signal for adjusting the resonance length of the selected second antenna, and connecting the selected second antenna and circuit by the generated switching signal.

9. The control method of claim 8, wherein the determining of the status of the first antenna comprises:

primarily checking the status of the first antenna based on the level of a signal received through the first antenna;

secondarily checking the status of the first antenna according to whether the first antenna is connected; and determining the status of the first antenna according to results of the primary checking and the secondary checking.

* * * * *